United States Patent
Tsukasaki et al.

(10) Patent No.: US 8,346,434 B2
(45) Date of Patent: Jan. 1, 2013

(54) VEHICLE-BODY BEHAVIOR CONTROL APPARATUS

(75) Inventors: Yuichiro Tsukasaki, Tokyo (JP); Masaru Kogure, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 901 days.

(21) Appl. No.: 12/007,388

(22) Filed: Jan. 9, 2008

(65) Prior Publication Data

US 2008/0177442 A1   Jul. 24, 2008

(30) Foreign Application Priority Data

Jan. 10, 2007   (JP) .................................... 2007-2815

(51) Int. Cl.
*B60G 17/015*   (2006.01)
*B60G 21/00*   (2006.01)
*B60G 21/045*   (2006.01)
*G06F 17/00*   (2006.01)
*B62D 6/00*   (2006.01)

(52) U.S. Cl. ........... 701/41; 701/48; 280/5.51; 280/5.52

(58) Field of Classification Search ............... 701/1, 36, 701/37, 38, 41, 48, 69, 70–72, 82, 89, 90, 701/91; 280/5.508, 5.509, 5.51, 5.52, 5.522
See application file for complete search history.

(56) References Cited

U.S. PATENT DOCUMENTS

| 6,962,355 | B2* | 11/2005 | Kwon | 280/86.75 |
| 6,962,356 | B2* | 11/2005 | Kwon | 280/86.75 |
| 2003/0209866 | A1* | 11/2003 | Kwon | 280/5.522 |

FOREIGN PATENT DOCUMENTS

JP   2005-170276   6/2005

* cited by examiner

*Primary Examiner* — Thomas Tarcza
*Assistant Examiner* — Edward Pipala
(74) *Attorney, Agent, or Firm* — Smith, Gambrell & Russell, LLP

(57) ABSTRACT

When a vehicle is turning, it is determined whether an inside turning wheel has sufficient grip force. If the inside wheel has sufficient grip force, left and right forces orthogonally input to the vehicle body are calculated based on longitudinal and lateral tire forces, and are checked if there is a difference in the left and right forces. If there is such a left-right force difference and the vehicle is not undergoing a braking operation, the turning angle of the inside wheel is corrected using a left-right independent steering device that independently controls the turning angles of left and right wheels, so that the difference becomes zero. Thus, the difference in left and right forces laterally input to the vehicle body is reduced to minimize a jack-up force. This improves the driving stability and achieves a good roll feel by means of a jack-down force, thereby achieving improved driving feel.

23 Claims, 5 Drawing Sheets

VEHICLE-BODY BEHAVIOR CONTROL APPARATUS

CROSS REFERENCES TO RELATED APPLICATIONS

The disclosure of Japanese Patent Application No. 2007-002815 filed on Jan. 10, 2007 including the specifications, drawings, and abstracts are incorporated by references herein.

BACKGROUND OF THE INVENTION

1. Field of the Invention

The present invention relates to a vehicle-body behavior control apparatus for minimizing a jack-up force generated on a vehicle body while a vehicle is turning.

2. Description of the Related Art

Generally, when vehicles such as automobiles are in the course of a turning operation, a so-called jack-up force is generated that lifts up the vehicle body during the turning operation. Such a force is one of the factors that can impair the driving stability. As countermeasures in the related art, the rolling height of the vehicle body has been lowered or the roll rigidity has been increased. However, these countermeasures unfavorably degrade riding comfort.

In order to solve this problem, Japanese Unexamined Patent Application Publication No. 2005-170276 discloses an example of a technology in which toe-angle adjusting means for individually adjusting toe angles of left and right wheels is provided. Specifically, in this technology, the toe-angle adjusting means controls the toe angles of the left and right wheels by increasing the lateral force of an inside turning wheel and decreasing the lateral force of an outside turning wheel within a predetermined range in which lateral acceleration during a turning operation is small.

In the technology disclosed in Japanese Unexamined Patent Application Publication No. 2005-170276, the toe-angle control is performed to increase the lateral force of an inside turning wheel and to decrease the lateral force of an outside turning wheel so as to reduce the difference in lateral tire forces between the inside and outside wheels. However, the control should be performed in view of forces acting orthogonally on the vehicle body instead of lateral tire forces, and moreover, is not performed in view of the case where the control wheels are driving wheels. For these reasons, such a technology is insufficient for effectively minimizing a jack-up force acting on the vehicle body to achieve a good roll feel for the driver.

SUMMARY OF THE INVENTION

In view of the circumstances described above, it is an object of the present invention to provide a vehicle-body behavior control apparatus that can effectively minimize a jack-up force acting on a vehicle body to prevent lifting of the vehicle body so that the driving stability can be improved and that a good roll feel can be achieved.

In order to achieve the aforementioned object, the present invention provides a vehicle-body behavior control apparatus that includes steering means configured to independently adjust turning angles or toe angles of left and right wheels of a vehicle; and controlling means configured to correct the turning angles or the toe angles of the left and right wheels via the steering means when the vehicle undergoes a turning operation so that left and right forces input to the vehicle body in a lateral direction due to longitudinal forces and lateral forces generated by the left and right wheels are equal to each other.

The vehicle-body behavior control apparatus according to the present invention can effectively minimize a jack-up force acting on a vehicle body to prevent lifting of the vehicle body so that the driving stability can be improved and that a good roll feel can be achieved.

DESCRIPTION OF THE PREFERRED EMBODIMENTS

Figure 1:
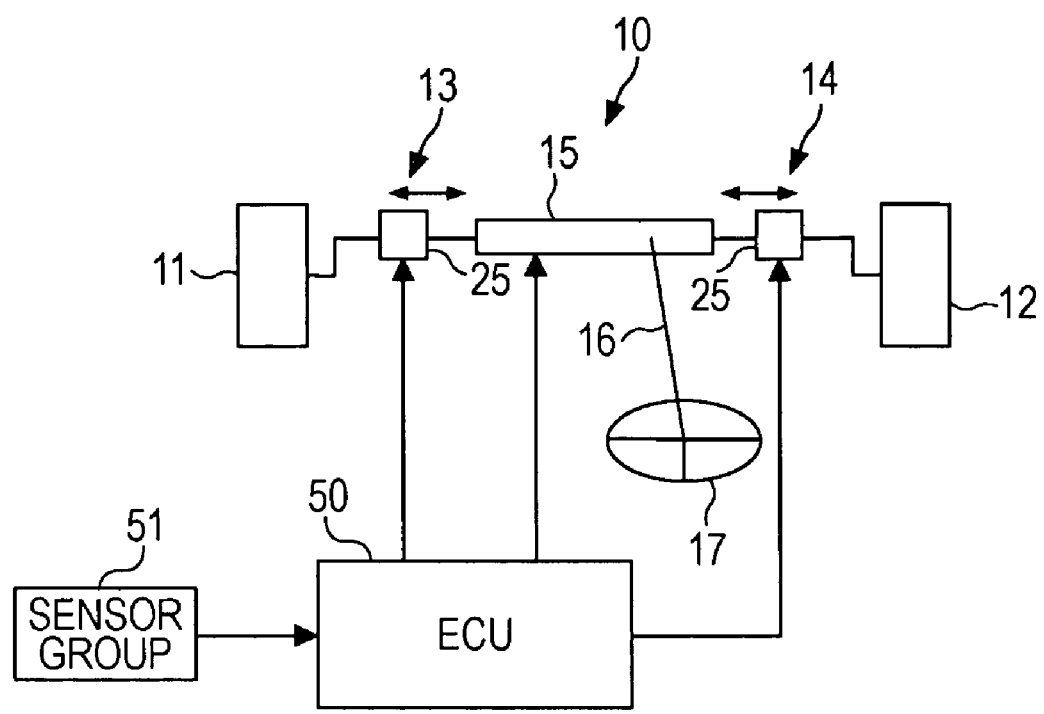
FIG. 1 schematically illustrates a left-right independent steering device for steering left and right wheels independently.
Figure 2:
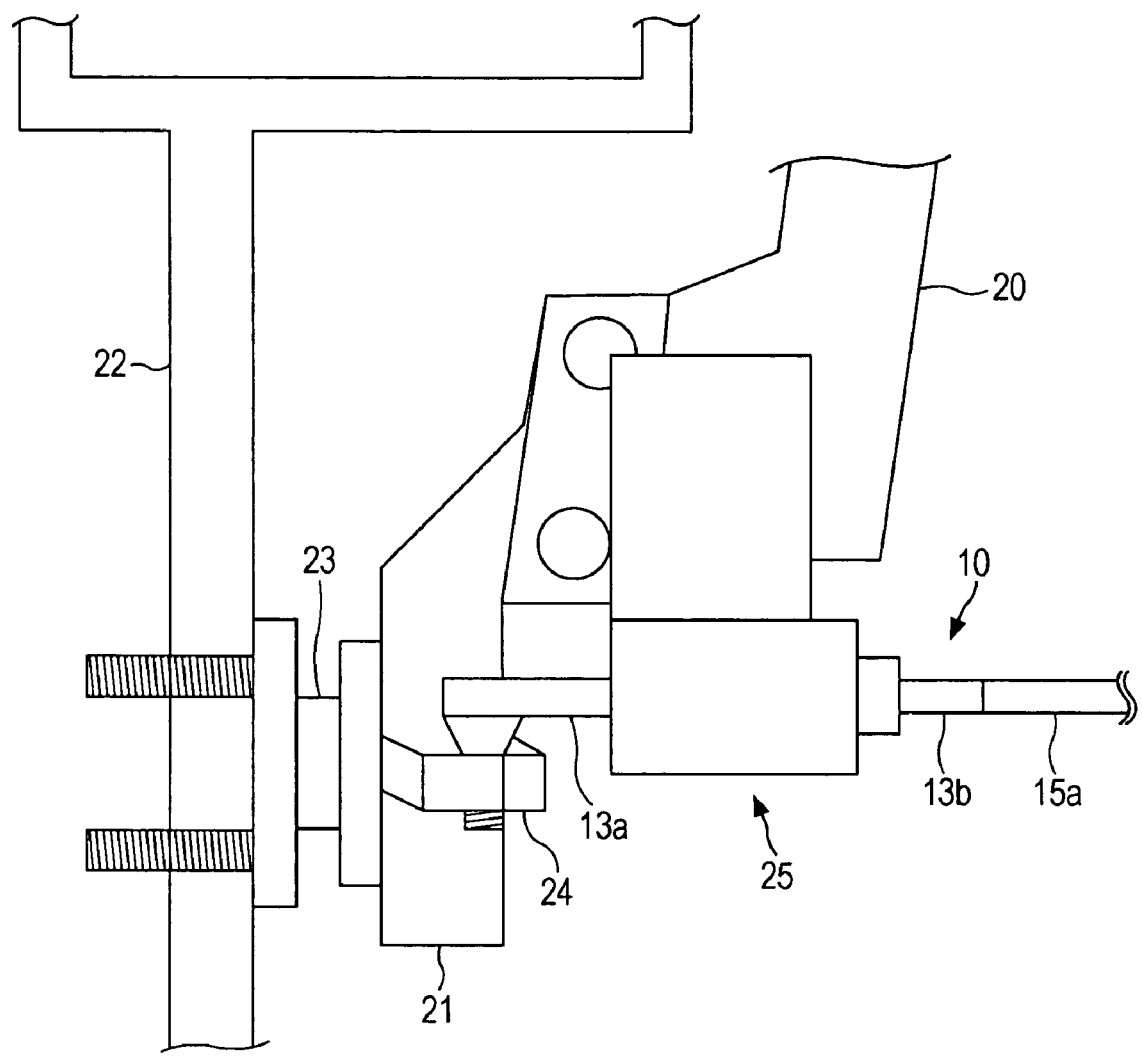
FIG. 2 is a schematic enlarged view of an area surrounding one of tie rods.
Figure 3:
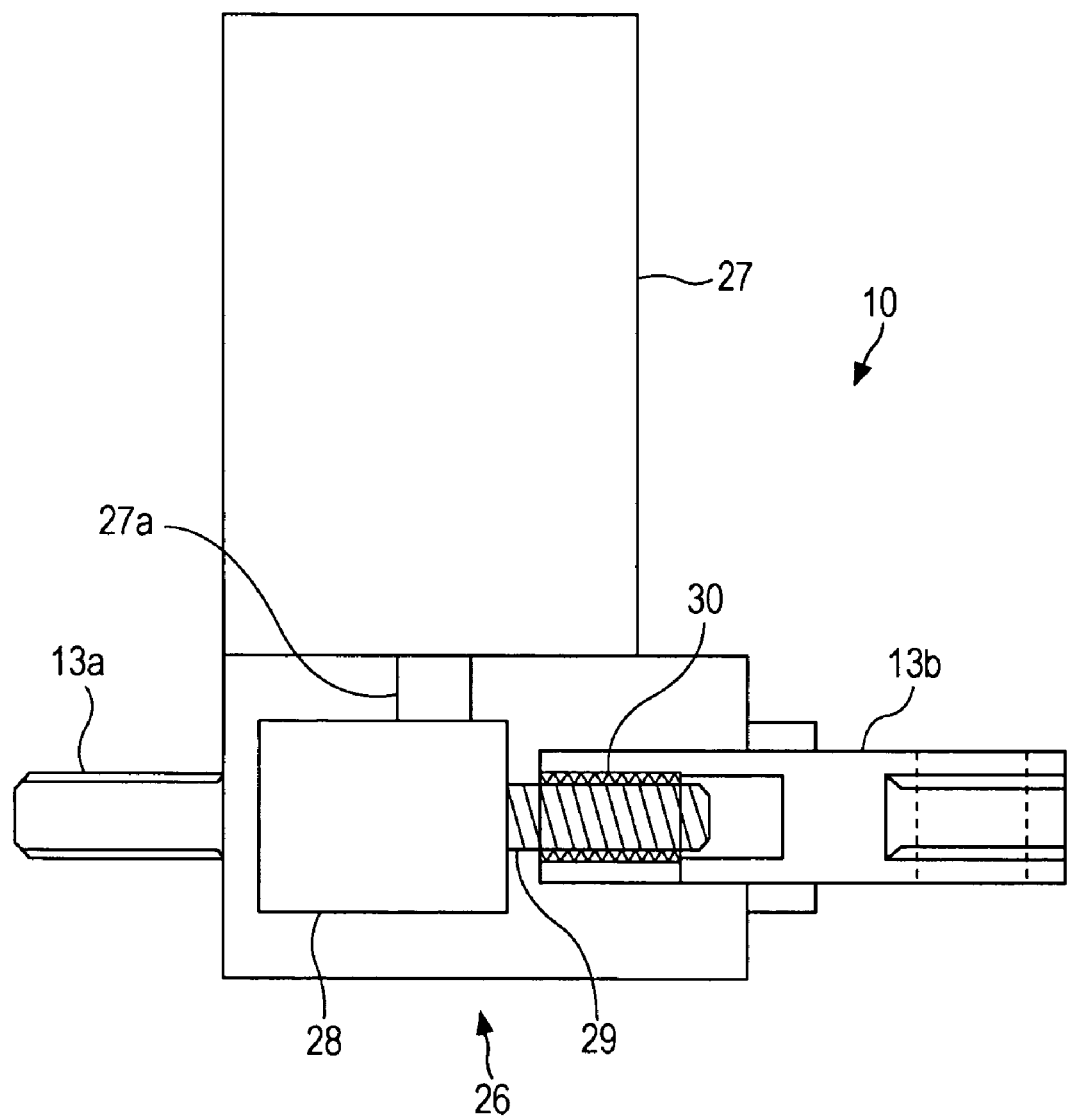
FIG. 3 illustrates one of telescopic mechanism portions.
Figure 4:
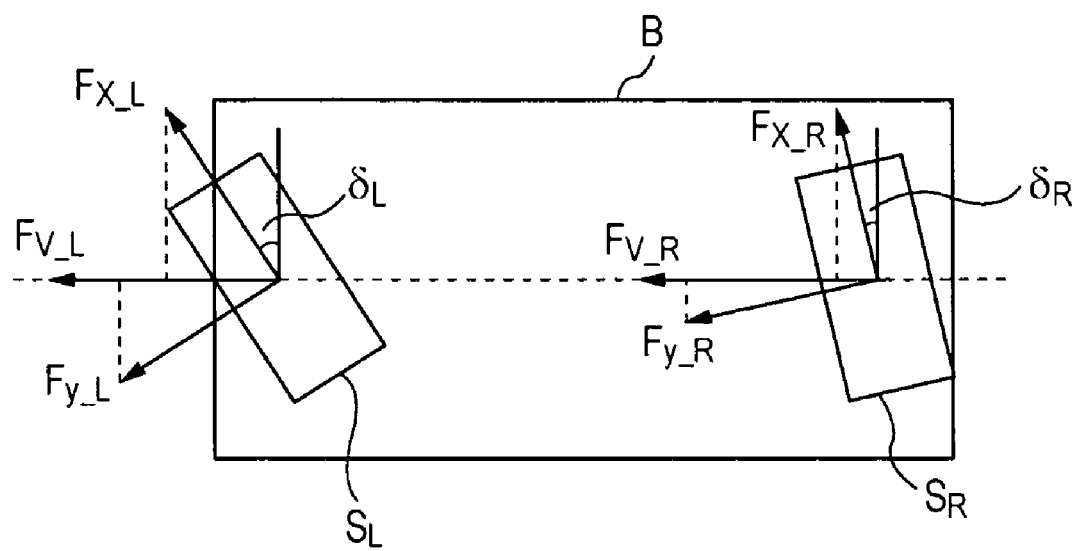
FIG. 4 illustrates tire forces generated by left and right wheels.
Figure 5:
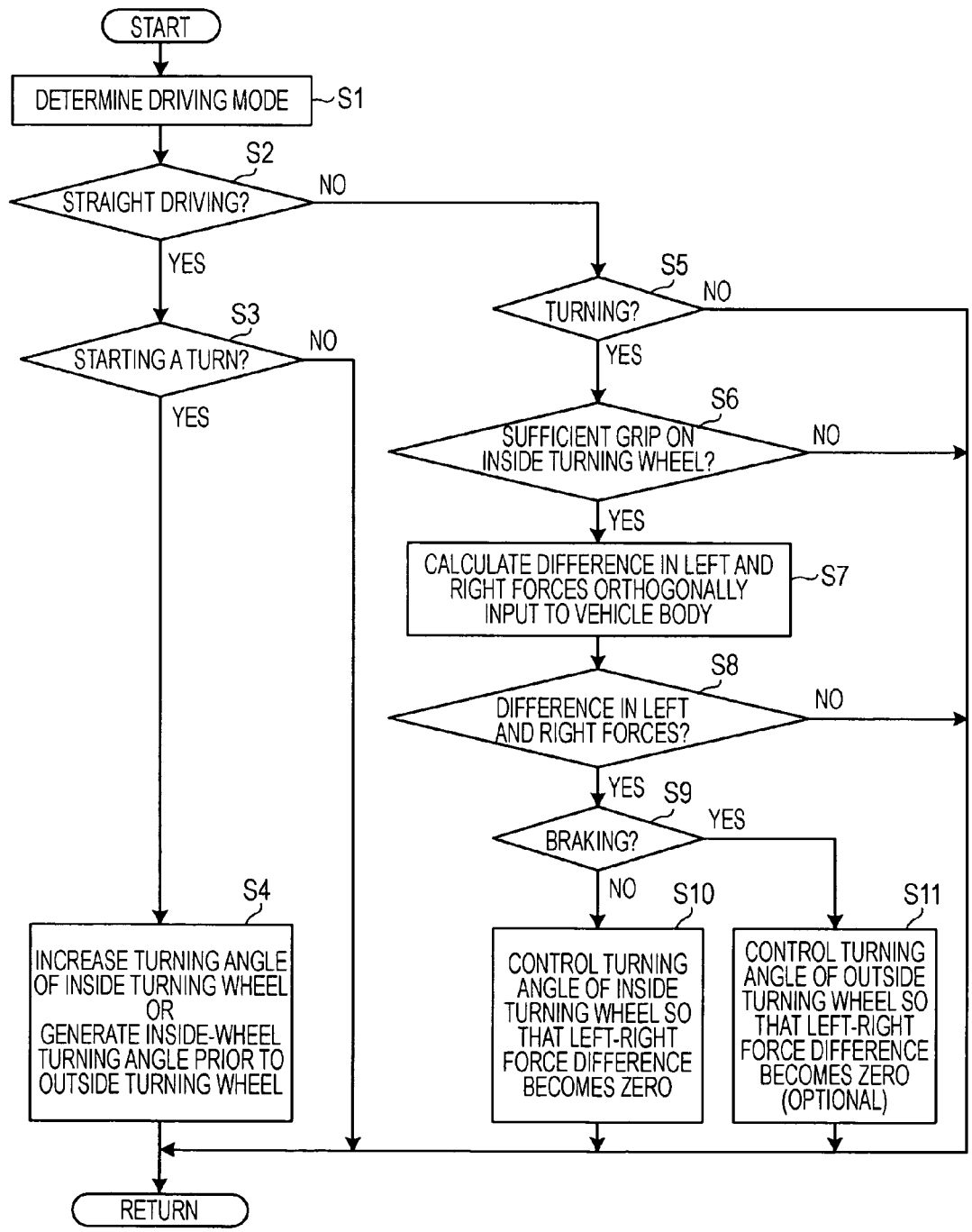
FIG. 5 is a flow chart of a turning-angle correction process.

Embodiments of the present invention will now be described with reference to the drawings. FIGS. 1 to 5 correspond to an embodiment of the present invention. Specifically, FIG. 1 schematically illustrates a left-right independent steering device 10 for steering left and right wheels independently. FIG. 2 is a schematic enlarged view of an area surrounding one of tie rods. FIG. 3 illustrates one of telescopic mechanism portions. FIG. 4 illustrates tire forces generated by left and right wheels. FIG. 5 is a flow chart of a turning-angle correction process.

A vehicle-body behavior control apparatus according to the present invention uses a steering device and a toe-angle control device contained in the vehicle to minimize a jack-up force acting on the vehicle body so as to effectively prevent lifting of the vehicle body. In addition, the vehicle-body behavior control apparatus utilizes a jack-down force to give the driver a good roll feel. This embodiment to be described below is directed to an example where a jack-up force acting on the vehicle body is minimized by means of the left-right independent steering device 10 shown in FIG. 1.

The left-right independent steering device 10 shown in FIG. 1 mainly includes tie rods 13 and 14 respectively linked to left and right front wheels 11 and 12 and axially expandable/contractible by means of telescopic mechanism portions 25, and an electric power steering mechanism (EPS) 15 whose opposite ends are respectively connected to the tie rods 13 and 14. The EPS 15 has a steering wheel 17 linked thereto with a steering shaft 16 interposed therebetween, so as to function as a steering shaft that operates in conjunction with a steering operation.

In this embodiment, the telescopic mechanism portions 25 for the tie rods 13 and 14 are ball-screw-type linear actuators driven with an electric motor and are symmetrically disposed at left and right positions, respectively. The following description will be directed to the tie rod 13 representatively of the two tie rods 13 and 14. Referring to FIG. 2, a front hub 23 onto which a front wheel 22 is mounted is suspended from a front housing 21 that receives a front strut 20. The front hub 23 is coupled to a tie-rod end 13a, serving as one end of the tie rod 13, by means of a knuckle 24. The other end of the tie rod 13 is coupled to a steering rod 15a of the EPS 15 and functions as a piston rod 13b that can advance or recede in the axial direction by means of the telescopic mechanism portion 25.

Referring to FIG. 3, the telescopic mechanism portion 25 mainly includes a main body 26 to which the tie-rod end 13a is fixed, and an electric motor 27 serving as an actuator attached to the main body 26. The main body 26 accommodates therein a gear box 28 that contains a gear linked to and rotated by a rotary shaft 27a of the electric motor 27, and a gear group meshed with the gear. The electric motor 27 may be replaced with a hydraulic motor that can be rotated hydraulically.

A ball-screw shaft 29 protrudes from the gear box 28 in a direction perpendicular to the extending direction of the rotary shaft 27a of the electric motor 27. A ball-screw nut 30 provided at one end of the piston rod 13b is screwed to the ball-screw shaft 29. Thus, when the ball-screw shaft 29 is rotated in response to rotation of the electric motor 27, the nut 30 causes the piston rod 13b to advance or recede, thereby increasing or decreasing the length of the tie rod 13. Accordingly, this allows for a left-right independent steering operation in which the left and right front wheels 11 and 12 can be steered independently.

The telescopic mechanism portions 25 for the tie rods 13 and 14 and the EPS 15 are connected to an electronic control unit (ECU) 50. The ECU 50 is equipped with a microcomputer and a peripheral circuit, and is connected to a sensor group 51 provided in the vehicle. The sensor group 51 includes various sensors, such as a vehicle-speed sensor for detecting a vehicle speed, a wheel-speed sensor for detecting a wheel speed, a yaw-rate sensor for detecting a yaw rate, a G sensor for detecting lateral acceleration, sensors for detecting vehicle conditions such as a brake switch for detecting a brake operation and a parking switch for detecting the parking position of a transmission, sensors for detecting driving amounts and driving conditions of the telescopic mechanism portions 25 and the EPS 15, sensors for detecting expansion/contraction amounts and expansion/contraction speeds of the respective tie rods 13 and 14, sensors for detecting turning angles of the respective wheels, and a sensor for detecting a steering angle in accordance with a steering operation performed by a driver.

The ECU 50 is connected to other in-vehicle electronic control units in a two-way communicable fashion via, for example, a network (not shown). Based on information from the sensor group 51 and control information sent from these other control units, the ECU 50 controls the telescopic mechanism portions 25 and the EPS 15 so that the left and right front wheels 11 and 12 are set at optimal steering angles, thereby performing left-right independent steering control.

Regarding this left-right independent steering control, the ECU 50 controls the left-right independent steering device 10 when the vehicle is turning, so as to minimize a jack-up force acting on the vehicle body. In addition, the ECU 50 allows a jack-down force to be generated to prevent lifting of the vehicle body, thereby improving the driving stability and allowing for good roll feel.

A jack-up force acting on the vehicle body can be minimized by correcting the turning angles in view of tire forces generated by the left and right wheels. Specifically, referring to FIG. 4, in a typical vehicle, tire forces generated by left and right wheels SL and SR are represented by longitudinal forces (driving forces) Fx_L and Fx_R and lateral forces Fy_L and Fy_R, respectively (the additional characters "L" and "R" respectively indicating left and right). In the case of non-driving wheels, the longitudinal forces Fx_L and Fx_R are significantly small except for at the time of braking.

Components of tire forces affecting the jack-up and jack-down of the vehicle body are orthogonal components Fv_L and Fv_R that a vehicle body B receives in the lateral direction. The left-right independent steering device 10 is used to correct turning angles δL and δR of the left and right wheels so as to control the magnitude relationship between the orthogonal components Fv_L and Fv_R, whereby the jack-up force can be minimized and the jack-down force can be applied.

In detail, as will be described hereinafter, for an initial stage of a turning operation of the vehicle, the turning angle of the inside wheel is set larger than that of the outside wheel or is generated prior to that of the outside wheel so that a jack-down force is generated on the vehicle. In the course of a turning operation, the input to the vehicle body based on tire forces is equalized between the left and right wheels so that a load applied to the vehicle body is reduced. Accordingly, this minimizes the jack-up force.

Initial Stage of Turning Operation

When the driver performs a steering operation from a straight-driving mode, one of the following methods (a1) and (a2) is applied to generate a jack-down force on the vehicle body so as to give a good roll feel to the driver.

(a1) With respect to a steering angle set in accordance with a steering operation performed by the driver, a turning angle of an inside turning wheel is set larger than that of an outside turning wheel. Thus, a lateral force produced by the inside wheel becomes greater than that produced by the outside wheel, whereby a jack-down force is generated.

(a2) With respect to a steering angle set in accordance with a steering operation performed by the driver, a phase difference is set between the steering-angle/inside-wheel-turning-angle and the steering-angle/outside-wheel-turning-angle, and the phase is advanced such that the inside wheel makes a turn prior to the outside wheel, whereby a jack-down force is generated.

During Turning Operation

Depending on differences in system configurations according to the presence of sensors for detecting forces produced by the respective wheels or operation amounts or the presence of estimating functions, one of the following methods (b1), (b2), and (b3) is applied to correct the turning angles of the left and right wheels.

(b1) One of or each of the left and right turning angles δL and δR is corrected so that the left and right components, orthogonal to the vehicle body, of the resultant forces of the longitudinal forces Fx_L and Fx_R and the lateral forces Fy_L and Fy_R of the respective wheels are equal to each other.

This method corresponds to a system that has axial-force sensors, such as strain gauges, for detecting the longitudinal and lateral tire forces of the respective wheels, sensors for detecting the turning angles, or a function for estimating these forces and angles. Specifically, one of or each of the left and right turning angles δL and δR is corrected so that the following expression (1) is satisfied. If the driving force is small or if the turning wheels are driven wheels, the longitudinal tire forces may be calculated as zero.

$$Fx\_L \cdot \sin \delta L + Fy\_L \cdot \cos \delta L = Fx\_R \cdot \sin \delta R + Fy\_R \cdot \cos \delta R \qquad (1)$$

For example, assuming that the vehicle makes a left turn, if a value at the left side of the expression (1) is small, the left-side value is made larger by increasing the turning angle δL of the inside turning wheel so that the expression (1) can be satisfied. Alternatively, the right-side value may be made smaller by decreasing the turning angle δR of the outside turning wheel.

If the vehicle undergoes deceleration (braking) during a turning operation, it is desirable to decrease the turning angle δR of the outside turning wheel or not to perform the correction since the deceleration can possibly induce tack-in. On the other hand, if it is determined that the tire grip force of at least one of the left and right wheels has reached a limit, the expression (1) is difficult to be satisfied. For this reason, the turning-angle correction process is not implemented in this state and is performed after the grip force is recovered.

In order to recover the tire grip force, for example, the turning angle of a wheel with sufficient tire grip force is increased and the turning angle of a wheel with insufficient tire grip force is decreased, so as to achieve a state where there are sufficient tire grip forces in the left and right wheels. If both left and right wheels have insufficient tire grip forces, the turning angle of at least one of the left and right wheels is decreased so that the grip forces can be recovered.

(b2) One of or each of the left and right turning angles δL and δR is corrected so that the left and right components, orthogonal to the vehicle body, of the resultant forces of the longitudinal forces Fx_L and Fx_R and lateral forces estimated from cornering powers kL and kR and slip angles are equal to each other.

This method corresponds to a system that has sensors for detecting longitudinal tire forces, turning angles, and tire slip angles of the respective wheels, or a function for estimating these forces and angles. Specifically, one of or each of the left and right turning angles δL and δR is corrected so that the following expression (2) is satisfied. If the driving force is small or if the turning wheels are driven wheels, the longitudinal tire forces may be calculated as zero.

$$Fx\_L \cdot \sin \delta L + kL \cdot \beta L \cdot \cos \delta L = Fx\_R \cdot \sin \delta R + kR \cdot \beta R \cdot \cos \delta R \quad (2)$$

Here, βL and βR represent tire slip angles.

In this case, the turning-angle correction process is the same as that in the case of expression (1).

(b3) One of or each of the left and right turning angles δL and δR is corrected so that self-aligning torques SAT of the left and right wheels are equal to each other.

This method corresponds to a system that has a function for detecting or estimating the turning angles or self-aligning torques SAT of the respective wheels. The input to the vehicle body is represented as self-aligning torques SAT of the respective wheels. For example, when the vehicle is making a left turn, if the self-aligning torque SAT of the left wheel (i.e. the inside turning wheel) is smaller than that of the right wheel (i.e. the outside turning wheel), the turning angle δL of the inside turning wheel is increased so that the self-aligning torque SAT thereof is made equal to that of the right wheel. Alternatively, the turning angle δR of the outside turning wheel may be decreased.

At the time of braking, since there is a possibility that tack-in may occur, it is desirable to decrease the turning angle δR of the outside turning wheel or not to perform the correction.

If the self-aligning torque SAT of the left wheel does not increase even by increasing the turning angle δL of the inside turning wheel, it is determined that the tire grip force of the left wheel has reached a limit. In that case, the turning-angle correction process for equalizing the self-aligning torques SAT of the left and right wheels is not performed. An adjustment method in that case is the same as that mentioned in the above two examples.

The turning-angle correction process described above is performed in accordance with a program of the ECU 50 shown in the flow chart in FIG. 5. Such a turning-angle correction process will be described below.

The turning-angle correction process includes a first step S1 where an operation status of the vehicle is read on the basis of a signal from the sensor group 51, and the current driving mode is determined from, for example, yaw rate and wheel speed. In step S2, it is determined whether or not the vehicle is in a straight-driving mode.

If a straight-driving mode is confirmed, the process proceeds from step S2 to step S3 where it is determined whether or not the vehicle is starting to make a turn. If the vehicle is not starting to make a turn and continues to be in a straight-driving mode, the process exits the program from step S3 substantially without correcting the turning angles. On the other hand, if the vehicle is starting to make a turn, the process proceeds from step S2 to step S4 where a turning-angle correction process is executed.

Step S4 corresponds to a turning-angle correction process at an initial stage of a turning operation and is performed in accordance with the aforementioned method (a1) or (a2). Specifically, with respect to a steering angle set in accordance with a steering operation performed by the driver, the turning angle of the inside turning wheel is set larger than that of the outside turning wheel or the turning angle of the inside turning wheel is generated prior to that of the outside turning wheel.

On the other hand, if it is determined that the vehicle is not in a straight-driving mode in step S2, the process proceeds from step S2 to step S5 where it is determined whether or not the vehicle is in the course of making a turn. If the vehicle has already made a turn and is returning to the straight-driving mode, the process exits the program from step S5 without correcting the turning angles. On the other hand, if the vehicle is in the course of making a turn, the process proceeds from step S5 to step S6 where it is determined whether or not the inside turning wheel has sufficient grip force.

The determination of sufficient grip force in the inside turning wheel is implemented by calculating the degree of sufficiency in the grip forces of the respective wheels in an additional step and then determining the differences in the degree of sufficiency in the grip forces among the wheels. The degree of sufficiency in the grip forces of the respective wheels can be calculated on the basis of, for example, a road-surface friction coefficient, longitudinal and lateral forces of the respective wheels, and slip angles, or can be calculated from a change in self-aligning torques with respect to the lateral forces and slip angles.

In this process, if the inside turning wheel has insufficient grip force, the process exits the program from step S6 without correcting the turning angles. In contrast, if the inside turning wheel has sufficient grip force, the process proceeds from step S6 to step S7 where left and right forces orthogonally input to the vehicle body are calculated and a difference in these left and right forces is determined. The calculation of the forces orthogonally input to the vehicle body is appropriately selected from one of the calculation methods using the aforementioned expressions (1) and (2) and the calculation method based on the self-aligning torques SAT.

In step S8, it is determined whether or not there is a difference in the left and right forces orthogonally input to the vehicle body. If there is no difference in the left and right forces, the process exits the program without correcting the turning angles. In contrast, if there is a difference in the left and right forces, the process proceeds to step S9 where it is determined whether or not the vehicle is undergoing a braking operation. If the vehicle is not in the course of a braking operation, the process proceeds to step S10 where the turning angle of the inside turning wheel is controlled so that the difference in the left and right forces becomes zero. On the other hand, if the vehicle is in the course of a braking operation, the process proceeds to step S11 where the turning angle of the outside turning wheel is controlled so that the difference in the left and right forces becomes zero. However, if there is a possibility that tack-in may occur, the turning-angle correction in the course of a braking operation does not necessary have to be implemented.

According to the above-described embodiment, with the use of the left-right independent steering device 10 in which the turning angles of the left and right wheels are controllable independently by adjusting the tie-rod lengths by expansion/contraction, the magnitude relationship between forces input to the vehicle body in the lateral direction can be controlled by correcting the turning angles of the respective wheels in the course of a turning operation. Consequently, this reduces a difference in left and right forces laterally input to the vehicle body and thus minimizes a jack-up force, thereby improving the driving stability. In addition, with a jack-down force, a good roll feel can be imparted to the driver, thereby achieving improved driving feel.

What is claimed is:

1. A vehicle-body behavior control apparatus comprising:
   steering means configured to independently adjust turning angles or toe angles of left and right wheels of a vehicle; and
   controlling means configured to correct the turning angles or the toe angles of the left and right wheels via the steering means when the vehicle undergoes a turning operation so that forces input to the vehicle body in a lateral direction, due to longitudinal forces and lateral forces generated by the left and right wheels, are equal to each other, and wherein
   the longitudinal forces generated during a turn on the left and right wheels fall along respective longitudinal lines of travel of said left and right wheels, and the lateral forces generated on the left and right wheels fall orthogonal to the respective longitudinal lines of travel, and
   said controlling means determines left and right lateral forces input to the vehicle body, determines if the vehicle is undergoing a braking operation, and equalizes the left and right lateral forces input to the vehicle body under conditions wherein an orthogonal lateral force of one of said left and right wheels is out of directional alignment with a vehicle body lateral force generated by the longitudinal and lateral forces on said one of said left and right wheels.

2. The vehicle-body behavior control apparatus according to claim 1, wherein the controlling means sets the turning angle or the toe angle of an inside wheel larger than that of an outside wheel for an initial stage of the turning operation, the initial stage of the turning operation corresponding to a period in which a driver performs a steering operation from a straight-driving mode.

3. The vehicle-body behavior control apparatus according to claim 1, wherein the controlling means advances a phase of the turning angle or the toe angle of an inside wheel relative to that of an outside wheel for an initial stage of the turning operation, the initial stage of the turning operation corresponding to a period in which a driver performs a steering operation from a straight-driving mode.

4. The vehicle-body behavior control apparatus according to claim 1, wherein the controlling means determines the forces input to the vehicle body in the lateral direction from a calculation of resultant forces of the longitudinal forces and the lateral forces for each respective left and right wheel.

5. The vehicle-body behavior control apparatus according to claim 1, wherein the forces input to the vehicle body in the lateral direction are represented as self-aligning torques of the left and right wheels, and wherein the controlling means corrects the turning angles or the toe angles of the left and right wheels via the steering means so that the self-aligning torques of the left and right wheels are equal to each other.

6. The vehicle-body behavior control apparatus according to claim 1, wherein if the vehicle undergoes deceleration in the course of the turning operation, the controlling means does not perform correction for increasing the turning angle or the toe angle of an outside turning wheel.

7. The vehicle-body behavior control apparatus according to claim 1, wherein if a grip force of one of the left and right wheels is determined to have reached a limit, the controlling means increases the turning angle or the toe angle of the wheel having a sufficient grip force and decreases the turning angle or the toe angle of the wheel having an insufficient grip force, and performs the correction after the grip force is recovered.

8. The vehicle-body behavior control apparatus according to claim 1, wherein if grip forces of both of the left and right wheels are determined to have reached a limit, the controlling means decreases the turning angle or the toe angle of at least one of the left and right wheels, and performs the correction after the grip forces are recovered.

9. A vehicle-body behavior control apparatus comprising:
   a steering device that is connected with left and right wheels of a vehicle to independently adjust turning angles or toe angles of the left and right wheels of the vehicle; and
   a toe angle control device which communicates with said steering device as to have said steering device generate corrective turning angles or toe angles in the left and right wheels when the vehicle undergoes a turning operation so that forces input to the vehicle body in a lateral direction, due to longitudinal forces and lateral forces generated by the left and right wheels, are equal to each other; wherein
   the longitudinal forces generated on the left and right wheels during a turn fall along respective longitudinal lines of travel of said left and right wheels, and the lateral forces generated on the left and right wheels fall orthogonal to the respective longitudinal lines of travel, and
   said control device is configured to determine said lateral forces input to the vehicle body, determine if the vehicle is undergoing a braking operation, and equalize said lateral forces input to the vehicle body under conditions wherein an orthogonal lateral force of one of said left and right wheels is out of directional alignment with a vehicle body lateral force generated by the longitudinal and lateral forces on said one of said left and right wheels.

10. The vehicle-body behavior control apparatus according to claim 9, wherein said toe angle control device sets the turning angle or the toe angle of an inside wheel larger than that of an outside wheel for an initial stage of the turning operation, the initial stage of the turning operation corresponding to a period in which a driver performs a steering operation from a straight-driving mode.

11. The vehicle-body behavior control apparatus according to claim 9, wherein said toe angle control device advances a phase of the turning angle or the toe angle of an inside wheel relative to that of an outside wheel for an initial stage of the turning operation, the initial stage of the turning operation corresponding to a period in which a driver performs a steering operation from a straight-driving mode.

12. The vehicle-body behavior control apparatus according to claim 9, further comprising a sensor group that detects vehicle conditions, and wherein said toe angle control device receives sensor inputs from said sensor group and determines the forces input to the vehicle body in the lateral direction from resultant forces of the longitudinal forces and the lateral forces.

13. The vehicle-body behavior control apparatus according to claim 9, further comprising a sensor group that detects vehicle conditions, and wherein said toe angle control device receives sensor inputs from said sensor group, and wherein the forces input to the vehicle body in the lateral direction are represented as self-aligning torques of the left and right wheels, and wherein said toe angle control device corrects the turning angles or the toe angles of the left and right wheels via the steering device so that the self-aligning torques of the left and right wheels are equal to each other.

14. The vehicle-body behavior control apparatus according to claim 9, wherein if the vehicle undergoes deceleration in the course of the turning operation, said toe angle control device does not perform correction for increasing the turning angle or the toe angle of an outside turning wheel.

15. The vehicle-body behavior control apparatus according to claim 9, wherein if a grip force of one of the left and right wheels is determined to have reached a limit, said toe angle control device increases the turning angle or the toe angle of the wheel having a sufficient grip force and decreases the turning angle or the toe angle of the wheel having an insufficient grip force, and performs the correction after the grip force is recovered.

16. The vehicle-body behavior control apparatus according to claim 9, wherein if grip forces of both of the left and right wheels are determined to have reached a limit, said toe angle control device decreases the turning angle or the toe angle of at least one of the left and right wheels, and performs the correction after the grip forces are recovered.

17. The vehicle-body behavior control apparatus of claim 9 wherein said steering device comprises a left positioned motor which receives position adjustment communications from said toe angle control device and a right positioned motor which receives position adjustment control communications from said toe angle control device, and wherein said steering device further comprises a left tie rod linked to the left wheel of the vehicle and a left telescopic mechanism which is in driving communication with said left motor and receives the left tie rod in an adjustable fashion, and a right tie rod linked to the right wheel of the vehicle and a right telescopic mechanism which is in driving communication with said right motor and receives the right tie rod in an adjustable fashion.

18. The vehicle-body behavior control apparatus of claim 17 wherein said left and right telescopic mechanisms each comprise a ball-screw-type linear actuator.

19. The vehicle-body behavior control apparatus of claim 9 wherein said steering device comprises an electric power steering mechanism that receives steering input from a steering wheel of a vehicle, left and right tie rods connected with said electric power steering mechanism and to respective left and right wheels, and respective left and right telescopic mechanisms for adjusting relative position of said tie rods relative to the respective left and right wheels.

20. The vehicle-body behavior control apparatus of claim 9 further comprising a sensor group that detects vehicle conditions, and wherein said toe angle control device receives sensor inputs from said sensor group, and wherein said toe angle control device comprises a microcomputer with a peripheral electrical circuit and is in communication with both said sensor group and an adjustment mechanism of said steering device, whereby said control device generates corrective turning angles by way of adjustments in said adjustment mechanism following processing of the sensor inputs by the microcomputer of said toe angle control device.

21. A vehicle-body behavior control apparatus comprising:
steering means configured to independently adjust turning angles or toe angles of left and right wheels of a vehicle; and
controlling means configured to correct the turning angles or the toe angles of the left and right wheels via the steering means when the vehicle undergoes a turning operation so that forces input to the vehicle body in a lateral direction, due to longitudinal forces and lateral forces generated by the left and right wheels, are equal to each other; wherein
the controlling means determines the forces input to the vehicle body in the lateral direction from a calculation of resultant forces of the longitudinal forces and the lateral forces for each respective left and right wheel, and, before correcting the turning angles or the toe angles of the wheels, determines if the vehicle is undergoing a braking operation.

22. The vehicle body behavior control apparatus of claim 21, wherein the controlling means determines the forces input to the vehicle body in the lateral direction from a calculation of resultant forces of the longitudinal forces and the lateral forces for each respective left and right wheel based on $Fx\_L \cdot \sin \delta L + Fy\_L \cdot \cos \delta L = Fx\_R \cdot \sin \delta R + Fy\_R \cdot \cos \delta R$, wherein $Fx\_L$ and $Fx\_R$ are longitudinal forces on the left and right wheels, respectively, and $Fy\_L$ and $Fy\_R$ are the lateral forces on the left and right wheels respectively and $\delta L$ and $\delta R$ are the left and right turning angles.

23. A vehicle-body behavior control apparatus comprising:
a steering device that is connected with left and right wheels of a vehicle to independently adjust turning angles or toe angles of the left and right wheels of the vehicle; and
a toe angle control device which communicates with said steering device as to have said steering device generate corrective turning angles or toe angles in the left and right wheels when the vehicle undergoes a turning operation so that forces input to the vehicle body in a lateral direction, due to longitudinal forces and lateral forces generated by the left and right wheels, are equal to each other; wherein
said toe angle control device equalizes the forces input to the vehicle body using a determination selected from (a), (b) and (c):
(a) $Fx\_L \cdot \sin \delta + Fy\_L \cdot \cos \delta L = Fx\_R \cdot \sin \delta R + Fy\_R \cdot \cos \delta R$
(b) $Fx\_L \cdot \sin \delta L + kL \cdot \beta L \cdot \cos \delta L = Fx\_R \cdot \sin \delta R + kR \cdot \beta R \cdot \cos \delta R$
(c) an equalization of self-aligning torques of the left and right wheels,
wherein $Fx\_L$ and $Fx\_R$ are longitudinal forces on the left and right wheels, respectively; $Fy\_L$ and $Fy\_R$ are lateral forces on the left and right wheels, respectively; $\delta L$ and $\delta R$ are the left and right turning angles, respectively; $kL$ and $kR$ represent cornering force values for the left and right wheels, respectively; and $\delta L$ and $\delta R$ represent tire slip angles, and
before correcting the turning angles or toe angles of the wheels, the toe angle control device determines if the vehicle is undergoing a braking operation.

* * * * *